United States Patent [19]

Elger

[11] Patent Number: 5,588,496
[45] Date of Patent: Dec. 31, 1996

[54] SLIP CLUTCH ARRANGEMENT FOR POWER TOOL

[75] Inventor: William A. Elger, Waukesha, Wis.

[73] Assignee: Milwaukee Electric Tool Corporation, Brookfield, Mich.

[21] Appl. No.: 275,151

[22] Filed: Jul. 14, 1994

[51] Int. Cl.⁶ .............................. B60K 41/02; F16D 3/56
[52] U.S. Cl. ............................. 173/178; 192/56.1
[58] Field of Search .................. 173/13, 48, 176, 173/179, 178; 192/56.1

[56] References Cited

U.S. PATENT DOCUMENTS

| | | | |
|---|---|---|---|
| 1,744,976 | 1/1930 | Levedahl . | |
| 2,566,183 | 8/1951 | Forss | 74/421 |
| 3,454,059 | 7/1969 | Sindelar | 144/32 |
| 3,720,269 | 3/1973 | Wanner et al. | 173/48 |
| 3,828,863 | 8/1974 | Bleicher et al. | 173/48 |
| 3,934,629 | 1/1976 | Boman | 144/32 |
| 3,937,036 | 2/1976 | Sauerwein | 173/178 |
| 4,006,785 | 2/1977 | Roll et al. | 173/12 |
| 4,220,230 | 9/1980 | Hansen | 192/56 R |
| 4,265,320 | 5/1981 | Tanaka et al. | 173/12 |
| 4,365,962 | 12/1982 | Regelsberger | 464/39 |
| 4,368,784 | 1/1983 | Wünsch et al. | 173/12 |
| 4,418,766 | 12/1983 | Grossmann | 173/13 |
| 4,429,775 | 2/1984 | Teramoto | 173/178 |
| 4,446,931 | 5/1984 | Bleicher et al. | 173/48 |
| 4,485,698 | 12/1984 | Adman et al. | 81/57.11 |
| 4,487,272 | 12/1984 | Bleicher et al. | 173/48 |
| 4,719,976 | 1/1988 | Bleicher et al. | 173/109 |
| 4,732,217 | 3/1988 | Bleicher et al. | 173/104 |
| 4,809,572 | 12/1984 | Bleicher et al. | 173/48 |
| 4,901,610 | 2/1990 | Larson et al. | 81/473 |
| 4,967,888 | 11/1990 | Lippacher et al. | 192/56 R |
| 5,005,684 | 4/1991 | Fujii | 192/56 R |
| 5,092,441 | 3/1992 | Fujii | 192/56 R |
| 5,129,465 | 7/1992 | Rahm | 173/178 |
| 5,134,909 | 8/1992 | Sasaki | 81/473 |
| 5,201,374 | 4/1993 | Rahm | 173/178 |
| 5,209,308 | 5/1993 | Sasaki | 173/178 |

FOREIGN PATENT DOCUMENTS 2343353 3/1974 Germany .

Primary Examiner—Scott A. Smith
Attorney, Agent, or Firm—Michael, Best & Friedrich

[57] ABSTRACT

The invention provides a power tool including an improved slip clutch assembly for transmitting torque from a motor-driven driving member to the rotatably driveable output shaft of the tool. The clutch assembly includes an annular clutch gear around the output shaft. The clutch gear meshes with the driving member and includes circumferentially spaced pockets that correspond to circumferentially spaced, conically-shaped detent depressions in the output shaft. The clutch assembly also includes a plurality of ball members each positioned in one of the pockets in the clutch gear. The ball members are spring-biased toward seated positions in the detent depressions to engage torque transmission between the clutch gear and the output shaft. When subjected to an overload torque, the ball members unseat from the detent depressions with a ratcheting action to disengage torque transmission between the clutch gear and the output shaft.

21 Claims, 2 Drawing Sheets

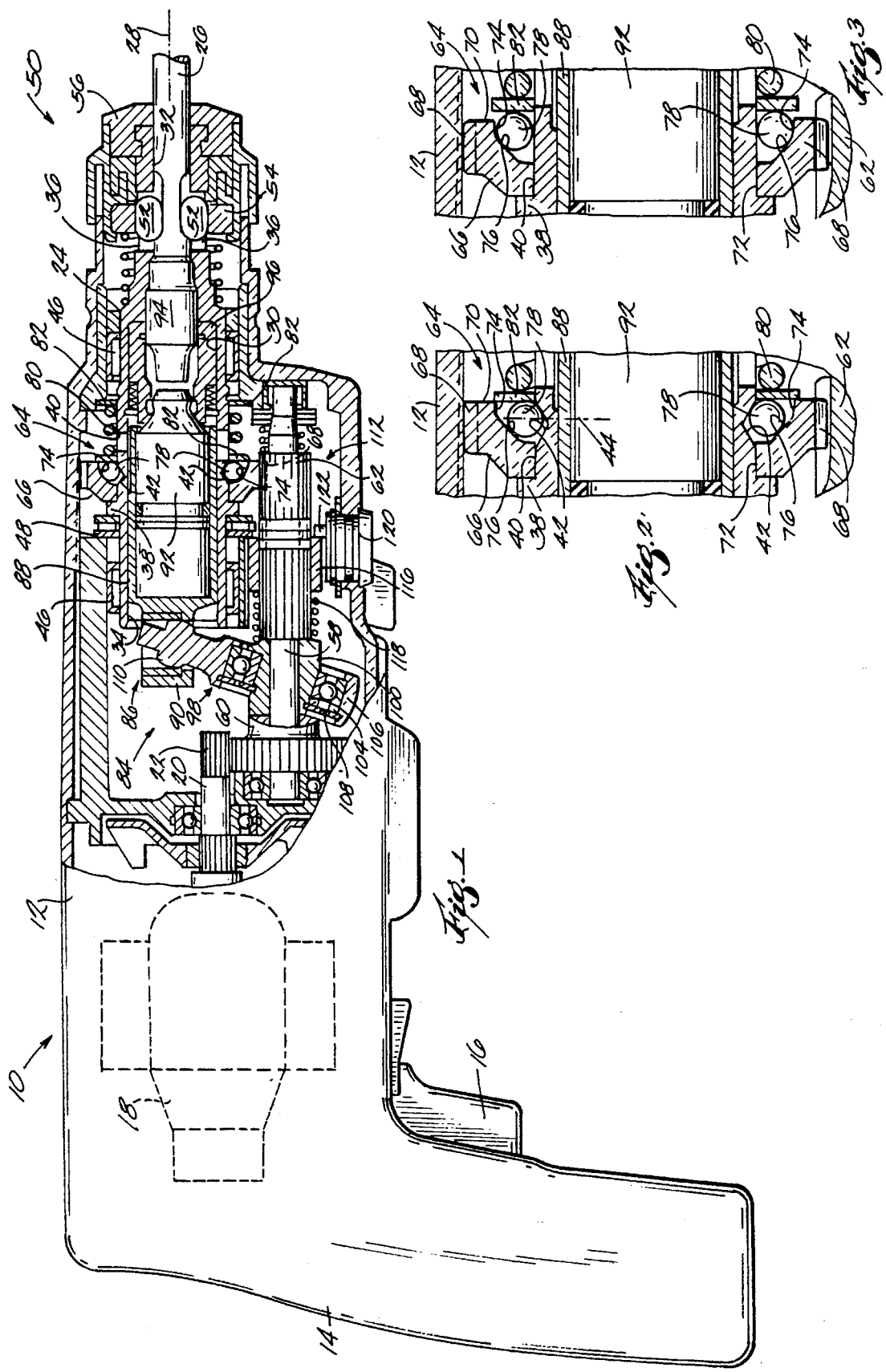

SLIP CLUTCH ARRANGEMENT FOR POWER TOOL

BACKGROUND OF THE INVENTION

1. Field of the Invention

The invention relates generally to power hand tools, such as rotary hammers and hammer drills for example, and more particularly to clutch arrangements for limiting torque in such tools.

2. Reference to Prior Art

Rotary percussive tools such as rotary hammers and hammer drills are capable of combining tool bit rotation with percussive action to drill holes in concrete and masonry. To prevent motor overload or burnout resulting from excessive torque loads within the tool, such as can result if the drill bit becomes stuck in a workpiece, it is known to provide rotary hammers and other power tools with slip clutch arrangements. Known slip clutches include driving and driven members that engage one another under the influence of a spring and that slip relative to one another when subjected to an overload torque sufficient to overcome the spring.

In one known slip clutch design conjugate teeth are embossed on the opposing faces of two clutch members, and the clutch members are spring biased into engagement to transmit torque between a driving member and a driven member such as an output shaft. When the tool is subjected to an overload torque, the spring force is overcome to permit the conjugate teeth to slip in a ratcheting action. An example of that type of slip clutch is illustrated in U.S. Pat. No. 4,719,976. That patent illustrates a hammer drill including a driven gear and a tool spindle having a flange. The driven gear and the flange are provided with corresponding lugs or teeth on their opposing faces and are spring biased toward one another. The teeth on the driven gear and the spindle flange slip relative to one another when subjected to an overload torque. Examples of similar slip clutch arrangements are provided in U.S. Pat. Nos. 4,446,931, 4,529,044 and 4,487,272.

Another known slip clutch arrangement used in power tools includes ball elements for transmitting torque between driving and driven members. In ball element clutch designs the ball elements are seated in corresponding detent depressions in the driven and driving members. When an overload torque is reached, the ball elements ride up out of the detent depressions in one of those members in a ratcheting action to decouple the driving and driven members. An example of a ball element clutch used in a power tool is provided in U.S. Pat. No. 2,566,183. That patent illustrates a clutch mechanism having a pair of clutch members and a spring for biasing those members together. The opposed faces of the clutch members have conical detent depressions, and balls are seated in corresponding pairs of depressions to transmit torque between the clutch members. When an overload torque is reached, the balls ride up out of successive depressions in one of the clutch members in a ratcheting action until normal torque loads are applied. Rotary hammers including ball element clutches are also illustrated in U.S. Pat. Nos. 3,828,863 and 3,720,269.

SUMMARY OF THE INVENTION

The invention provides a power tool with an improved slip clutch arrangement for limiting torque generated within the tool. The improved slip clutch arrangement includes ball elements for transmitting torque between driving and driven members and is designed for improved performance over prior art clutch designs. In particular, the improved slip clutch is compact relative to prior art designs and minimizes clutch preload (i.e., spring force needed to maintain the clutch in torque transmitting engagement) without lowering the slip or limiting the torque value of the tool. The improved slip clutch is also less susceptible to wear than prior art designs and provides smooth and consistent operation over the life of the tool.

More particularly, the invention provides a slip clutch assembly for a power tool which includes a rotatably driveable output shaft, a motor, and a driving member to transmit power from the motor to the output shaft. The slip clutch assembly includes an annular clutch member that is rotatably supported on the output shaft and that is preferably provided with gear teeth that mesh with the driving member. The clutch member includes along its inner diameter surface a set of circumferentially spaced pockets that correspond to circumferentially spaced detent depressions in the outer diameter surface of the output shaft. The detent depressions are preferably conically-shaped and their vertices are oriented transversely to the axis of rotation of the output shaft. The clutch assembly also includes ball elements that are held in the pockets and that are movable between seated and unseated positions in the detent depressions to engage and disengage torque transmission between the clutch member and the output shaft.

Under normal tool operating torques the ball members are spring-biased to their seated positions in the detent depressions so that torque is transmitted to the output shaft. In the event the tool experiences torque loads sufficient to overcome the spring (i.e., overload torque) the ball members ramp up out of the detent depressions and torque transmission ceases as the clutch member rotates relative to the output shaft. As the ball members ramp up out of successive detent depressions a ratcheting action is produced which continues until normal torque loads are restored allowing the spring to maintain the ball members in their seated positions.

The invention also provides a rotary hammer including a motor, a spindle, a percussive mechanism for imparting hammering action to a tool bit held by the spindle, a drive train including an intermediate shaft geared to the output of the motor so as to be driveable by the motor, and a slip clutch assembly between the intermediate shaft and the spindle. The clutch assembly includes an annular clutch gear mounted on the spindle and driven by the intermediate shaft, and means are provided for transmitting torque from the clutch gear to the spindle. The torque transmitting means is engageable to transmit torque from the clutch gear to the spindle when torque is below a predetermined overload torque and is disengageable to interrupt torque transmission when torque is above the predetermined overload torque.

The invention also provides a spindle assembly for use in a power tool. The spindle assembly includes a tool spindle including an outer surface with circumferentially spaced apart detent depressions. The spindle assembly also includes an annular clutch member around the tool spindle and including circumferentially spaced pockets opposing the detent depressions. The spindle assembly further includes a plurality of ball members each positioned in one of the pockets. The ball members are movable between seated positions in corresponding detent depressions to provide torque transmission between the clutch member and the tool spindle, and unseated positions with respect to the detent depressions to discontinue torque transmission between the clutch member and the tool spindle. Means are also provided to bias the ball members toward their seated positions in the detent depressions so that torque transmission is provided in the absence of an overload torque.

Other features and advantages of the invention will become apparent to those skilled in the art upon review of the following detailed description, claims and drawings.

BRIEF DESCRIPTION OF THE DRAWINGS

FIG. 1 is a partial sectional side elevational view of a power tool having a clutch arrangement embodying the invention.

FIG. 2 is an enlarged view of a portion of the power tool illustrated in FIG. 1 and showing the clutch arrangement in torque transmitting engagement.

FIG. 3 is a view similar to FIG. 2 and showing the clutch arrangement disengaged under an overload torque.

Figure 5:
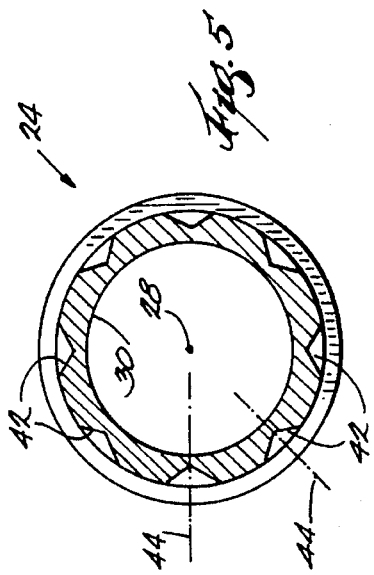
FIG. 5 is a view taken along line 5—5 in FIG. 4.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF A PREFERRED EMBODIMENT

Illustrated in FIG. 1 is a hand-held power tool incorporating a slip clutch arrangement that embodies the invention. While in the particular arrangement illustrated in the drawings the power tool is a rotary hammer 10, those skilled in the art will understand that the slip clutch arrangement may be employed in other rotary tools as well.

As shown in FIG. 1, the rotary hammer 10 includes a tool housing 12 having a rear hand grip 14. If desired, a side handle (not shown) can be mounted on the front of the tool housing 12 to provide an operator with increased control. To operate the rotary hammer 10, a trigger 16 is mounted on the tool housing 12 adjacent the rear hand grip 14 to control power supplied from a power source (not shown) to an electric motor 18. The motor 18 is mounted in the tool housing 12 and includes an armature shaft 20 that provides the mechanical output of the motor 18. The armature shaft 20 has a forward end portion including gear teeth that form a pinion 22.

Figure 4:
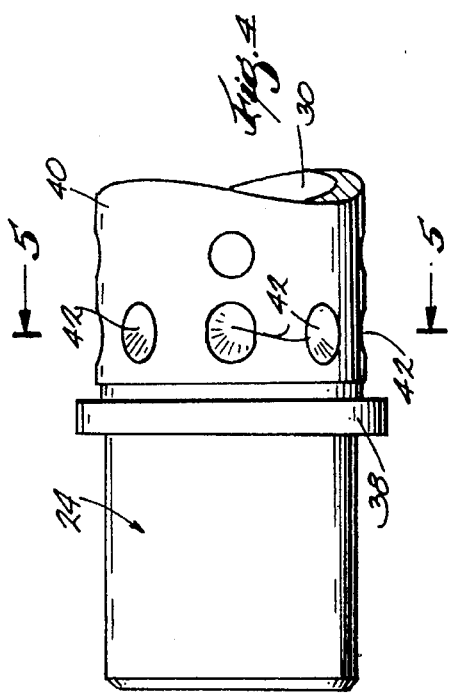
FIG. 4 is an enlarged elevational view of a portion of the output shaft of the tool shown in FIG. 1.

The rotary hammer 10 also includes an output shaft which in the illustrated arrangement is an elongated hollow spindle 24 for supporting a work tool, such as a tool bit 26, for rotation about a tool axis 28. The spindle 24 includes an inner diameter surface that defines an axial bore 30 having a forwardly opening bore section 32 for receiving the tool bit 26 and a rearwardly opening bore section 34. As further explained below, the front end part of the spindle 24 is provided with diametrically opposite and axially elongated slots 36 that are used in connection with securing the tool bit 26 in the spindle 24. For reasons also more fully explained below, the spindle 24 also includes (see FIG. 4) an annular flange 38 and an outer diameter surface 40 having circumferentially spaced apart detent depressions 42 positioned forwardly of the annular flange 38. As shown in FIG. 5, the detent depressions 42 are generally conically-shaped and preferably form angles of about 118 degrees, and each detent depression 42 has a vertex 44 oriented perpendicularly to the tool axis 28.

As shown in FIG. 1, the spindle 24 is rotatably mounted in the tool housing 12 by means such as needle bearings 46. To generally fix the spindle 24 against rearward axial movement within the tool housing 12, the annular flange 38 is abutted by a thrust bearing assembly 48.

The rotary hammer 10 also includes suitable means such as a tool chuck assembly 50 mounted on the front end of the tool housing 12 for securing the tool bit 26 in the spindle 24. The illustrated chuck assembly 50 is used on rotary hammer Model No. 5366-1 produced by Milwaukee Electric Tool Corporation, Brookfield, Wis., the assignee of the present invention. Briefly, the chuck assembly 50 includes a pair of radially displaceable locking elements or pins 52 housed in the slots 36 in the spindle 24. The chuck assembly 50 also includes a chuck collar 54 that is moveable by an operator to allow displacement of the pins 52 between the position shown in FIG. 1 to secure the tool bit 26 in the spindle 24 and a radially outwardly displaced position (not shown) to permit removal of the tool bit 26. To prevent dust and other debris from entering the rotary hammer 10, the chuck assembly 50 is provided with an annular dust cap 56.

To provide drilling action to the rotary hammer 10, means are provided for rotatably driving the spindle 24. In the particular arrangement illustrated in the drawings the driving means includes an intermediate shaft 58 having an intermediate gear 60 mounted thereon. The intermediate shaft 58 is journaled in the tool housing 12 by suitable bearings, and the intermediate gear 60 meshes with the pinion 22 on the armature shaft 20 to rotatably drive the intermediate shaft 58. The intermediate shaft 58 is also formed with a pinion member 62 that acts as a driving member for the spindle 24.

Figure 7:
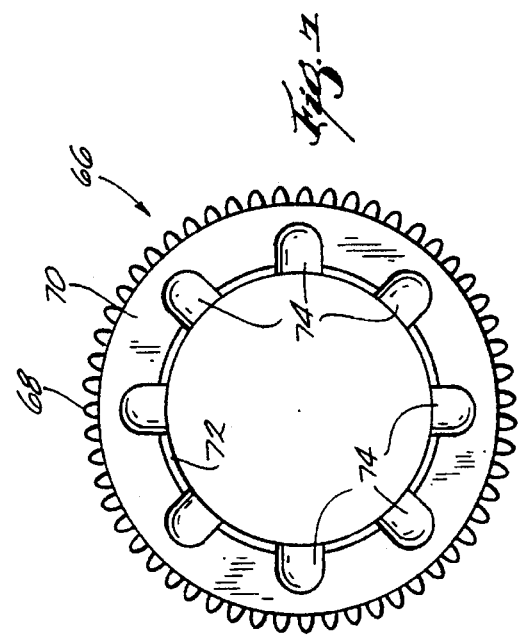
FIG. 7 is an end view of the clutch member taken along line 7—7 in FIG. 6.
Figure 6:
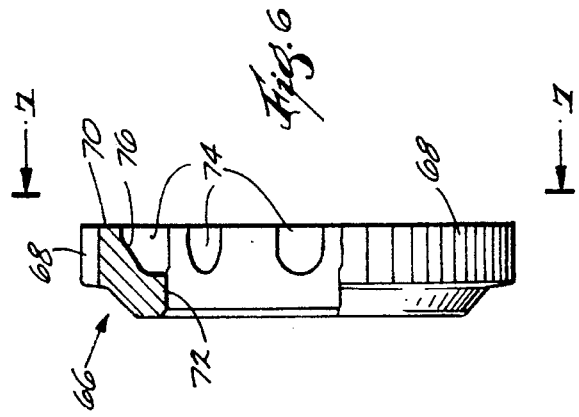
FIG. 6 is an enlarged side elevational view, partially in section, of the clutch member of the tool shown in FIG. 1.

To transmit torque from the intermediate shaft 58 to the spindle 24, the rotary hammer 10 is provided with a slip clutch assembly 64. The slip clutch assembly 64 includes an annular clutch member 66 supported on the spindle 24. In the illustrated arrangement the clutch member 66 is a clutch gear including (FIGS. 6 and 7) teeth 68 that mesh with the pinion member 62. As shown in FIGS. 6 and 7, the clutch member 66 also includes a front face 70, an inner diameter surface 72, and notches that form circumferentially spaced detent depressions or pockets 74 at the intersection of those surfaces. In the illustrated arrangement the number of pockets 74 corresponds to the number of detent depressions 42 in the spindle 24, and each pocket 74 includes a ramped surface 76. Each ramped surface 76 preferably forms an angle of about 44 or 45 degrees with the axis of the clutch member 66 (i.e., the tool axis 28).

The slip clutch assembly 64 also includes means for transmitting torque between the clutch member 66 and the spindle 24. In the illustrated arrangement the torque transmitting means includes the detent depressions 42, the pockets 74, and torque transmitting elements such as ball members 78. As shown in FIGS. 1 and 2, each of the ball members 78 is positioned in one of the pockets 74. In a preferred embodiment the ball members 78 are made of steel and each has a diameter of about 0.1969 inches.

The slip clutch assembly 64 is also provided with means for biasing the ball members 78 radially inwardly to seated positions in the detent depressions 42 to key the clutch member 66 to the spindle 24. While other biasing means could be employed, in the illustrated arrangement the means for biasing the ball members 78 to their seated positions includes the ramped surfaces 76 of the pockets 74 and a biasing member including a compression spring 80 positioned between a pair of washers 82 that form the ends of the spring 80. The spring 80 extends forwardly toward the front end of the spindle 24 from the front face 70 of the clutch member 66, and one of the washers 82 engages the ball members 78 to press them against the ramped surfaces 76 of the pockets 74. The ramped surfaces 76 then redirect the spring force to direct the ball members 78 radially inwardly into the detent depressions 42.

The spring 80 is selected to press the ball members 78 into their seated positions such that the force developed between the ball members 78 and the detent depressions 42 prevents relative motion therebetween until the torque load between the clutch member 66 and the spindle 24 reaches a predetermined value (i.e., the overload torque). The spring 80 also biases the clutch member 66 rearwardly against the flange 38 of the spindle 24 so that the clutch member 66 is axially stationary with respect to the spindle 24.

Under normal operating conditions when torque is below the predetermined overload torque the ball members 78 are seated (shown in FIGS. 1 and 2) in the detent depressions 42 to engage the clutch member 66 and the spindle 24 for torque transmission therebetween. When torque in the rotary hammer 10 exceeds the predetermined overload torque the ball members 78 overcome the preload in the spring 80 and ride up out of the detent depressions 42 to unseated positions (FIG. 3). This disengages torque transmission between the clutch member 66 and the spindle 24 and is accompanied by a ratcheting action. That ratcheting action is caused by the ball members 78 as they travel in and out of successive detent depressions 42 while the clutch member 66 rotates relative to the spindle 24. The ratcheting action alerts the operator to the torque overload condition and is believed to help free the tool bit 26 if it is jammed in a workpiece.

The rotary hammer 10 also includes means for impacting the tool bit 32 to provide hammering action. In the illustrated arrangement the impacting means includes a percussive mechanism 84 of known construction. The percussive mechanism 84 includes a striker assembly 86. As shown in FIG. 1, the striker assembly 86 includes an axially reciprocable hollow piston 88 housed in the rear bore section 34 of the spindle 24. The piston 88 includes a socket portion 90 extending rearwardly from the spindle 24. The striker assembly 86 also includes a striking ram 92 housed in the piston 88 and a generally freely axially moveable striker member 94 supported within a striker guide 96 fitted in the spindle bore 30. The ram 92 is induced to reciprocate under the influence of an air cushion which develops in the rear part of the piston 88 as the piston 88 reciprocates.

The percussive mechanism 84 also includes a wobble assembly 98 for reciprocating the piston 88. The wobble assembly 98 includes a wobble drum or shaft 100 that is rotatably supported on the intermediate shaft 58 and that includes an axially angled cam surface 104. The wobble assembly 98 also includes a wobble plate 106 mounted on the cam surface 92 via a pressed-in ball bearing assembly 108. The wobble plate 106 includes a head portion 110 received in the socket portion 90 of the piston 88. As the wobble shaft 100 is rotated, the wobble plate 106 rocks back and forth as it rides on the cam surface 104 to reciprocate the piston 88.

To facilitate use of the rotary hammer 10 as a drill, a shifting mechanism 112 for selectively switching the rotary hammer 10 into and out of a hammer mode is provided. As shown in FIG. 1, the shifting mechanism 112 includes an annular shift collar 116. The shift collar 116 is positioned around the intermediate shaft 58 and engages the wobble shaft 100 for common rotary movement therewith. A spring 118 is provided to bias the shift collar 116 forwardly so that the shift collar 116 also directly engages the intermediate shaft 58. In this position (FIG. 1) the shift collar 116 interconnects the wobble shaft 100 and the intermediate shaft 58 for common rotary movement, thus engaging the percussive mechanism 84.

To shift the rotary hammer 10, the shifting mechanism 112 includes a shift knob 120 that is rotatably supported on the tool housing 12 and that includes an upwardly extending eccentric pin 122. To shift the percussive mechanism 84 off, the shift knob 120 is pivoted 180° from the position shown in FIG. 1 to retract the shift collar 116 from engagement with the intermediate shaft 58. With the shift collar 116 in the retracted position, the wobble shaft 100 and the shift collar 116 are free to rotate relative to the intermediate shaft 58.

Advantageously, the slip clutch assembly 64 provides a compact design that facilitates maximization of detent cone angle and ball member size and minimization of spring preload requirements for a given overload torque value. In particular, by maximizing detent cone angle and ball member size the ball members 78 can be seated more shallowly in the detent depressions 42 while still providing adequate load-bearing surface contact therebetween. This reduces wear in the clutch assembly 64 and particularly the detent depressions 42 and the ball members 78 relative to prior art arrangements, and also reduces the spring preload required to maintain the ball members 78 in their seated positions under sub-overload torques. By reducing spring preload higher torque settings can be achieved with smaller or less expensive spring mechanisms than are used in prior art arrangements.

Various features of the invention are set forth in the following claims.

I claim:

1. A power tool comprising a tool housing, an output shaft rotatably mounted in the tool housing and including an outer surface including a plurality of circumferentially spaced detent depressions, a driving member mounted in the tool housing, and a clutch assembly operable to transmit torque from the driving member to the output shaft and including an annular clutch member supported on the output shaft and including a like plurality of circumferentially spaced pockets respectively corresponding to the detent depressions on the output shaft and respectively including ramps extending in acute relation to said output shaft, a like plurality of torque transmitting elements respectively retained in the pockets against circumferential movement relative to the clutch member and being movable between seated positions in the detent depressions to engage torque transmission between the clutch member and the output shaft and unseated positions with respect to the detent depressions to disengage torque transmission between the clutch member and the output shaft, and biasing means engaging the torque transmitting elements to bias the torque transmitting elements against said ramps and toward the seated positions in the detent depressions.

2. A power tool as set forth in claim 1 wherein the clutch member is axially stationary relative to the output shaft, and wherein the clutch member is rotatable relative to the output shaft when the torque transmitting elements are in their unseated positions.

3. A power tool as set forth in claim 1 wherein the power tool includes a drive train, and wherein the clutch member includes gear teeth meshing with the drive train.

4. A power tool as set forth in claim 1 wherein the torque transmitting elements are ball members, and the detent depressions are conical depressions.

5. A power tool comprising a tool housing, an output shaft rotatably mounted in the tool housing and including an outer surface including a plurality of circumferentially spaced conical depressions, a driving member mounted in the tool housing, and a clutch assembly operable to transmit torque from the driving member to the output shaft and including an annular clutch member supported on the output shaft and including a like plurality of circumferentially spaced pockets respectively corresponding to the conical depressions on the output shaft and respectively including a ramped surface, a like plurality of ball members respectively retained in the pockets against circumferential movement relative to the clutch member and being movable between seated positions in the conical depressions to engage torque transmission between the clutch member and the output shaft, and unseated positions with respect to the conical depressions to disengage torque transmission between the clutch member and the output shaft, and biasing means engaging one of the clutch member and the ball means to bias the ball members toward the seated positions in the conical depressions and including the ramped surfaces of the pockets and a spring member engaging the ball members.

6. A power tool as set forth in claim 4 wherein the output shaft has an axis of rotation, and wherein the detent depressions each have a vertex oriented perpendicularly to the axis of rotation of the output shaft.

7. A power tool as set forth in claim 1 wherein the biasing means includes a spring member operatively engaging the torque transmitting elements to retain the torque transmitting elements in the pockets.

8. A rotary hammer comprising a tool housing, a motor mounted in the tool housing and including an output, a hollow tool spindle having a tool axis, being mounted in the tool housing for rotation about the tool axis, being adapted to receive a tool bit, and including an outer surface, a percussive mechanism mounted in the tool housing for imparting hammering action to the tool bit and including a percussive member carried by the spindle for reciprocal movement thereof in the direction of the tool axis to strike the tool bit, and an intermediate shaft supported for rotation in the tool housing, geared to the motor output so that the intermediate shaft is driveable by the motor, and connected to the percussive member to effect reciprocal movement thereof incident to rotation of the intermediate shaft, and a slip clutch assembly between the intermediate shaft and the spindle for transmitting torque from the intermediate shaft to the spindle and including an annular clutch member geared to the intermediate shaft, and means for transmitting torque from the clutch member to the spindle, being operably engaged to transmit torque from the clutch member to the spindle when torque is below a predetermined value, and being disengaged to interrupt torque transmission between the clutch member and the spindle when torque is above the predetermined value, the torque transmitting means including a plurality of circumferentially spaced apart detent depressions in the outer surface of the tool spindle, a like plurality of circumferentially spaced pockets located in the clutch member in respectively opposing relation to the detent depressions and including respective ramp surfaces, a like plurality of ball members respectively retained in the pockets against circumferential movement relative to the clutch member and being movable between seated positions in the detent depressions to engage torque transmission between the clutch member and the tool spindle, and unseated positions with respect to the detent depressions to disengage torque transmission between the clutch member and the tool spindle, and a spring member in operative engagement with the ball members for biasing the ball members toward the ramp surfaces so as to locate the ball members in the seated positions in the detent depressions.

9. A rotary hammer as set forth in claim 8 wherein the spindle includes an outer surface, and wherein the means for transmitting torque includes a detent depression in the outer surface of the spindle, a detent depression in the clutch member, and a torque transmitting element in one of the detent depressions in the outer surface of the spindle and the clutch member, and wherein the slip clutch assembly includes means for biasing the torque transmitting element toward a seated position in the other of the detent depressions in the outer surface of the spindle and the clutch member.

10. A rotary hammer as set forth in claim 8 wherein the spindle includes an outer surface, and wherein the means for transmitting torque includes a plurality of circumferentially spaced apart detent depressions in the outer surface of the spindle, a plurality of circumferentially spaced apart pockets in the clutch member, a plurality of ball members each positioned in one of the pockets in the clutch member, the ball members being movable between seated positions in the detent depressions to engage torque transmission between the clutch member and the spindle, and unseated positions with respect to the detent depressions to disengage torque transmission between the clutch member and the spindle.

11. A rotary hammer as set forth in claim 10 wherein the slip clutch assembly includes means for biasing the ball members toward seated positions in the detent depressions.

12. A rotary hammer comprising a tool housing, a motor mounted in the tool housing and including an output, a hollow spindle having a tool axis, being mounted in the tool housing for rotation about the tool axis, being adapted to receive a tool bit, and including an outer surface, a percussive mechanism mounted in the tool housing for imparting hammering action to the tool bit and including a member connected to the spindle for effecting reciprocal movement thereof in the direction of the tool axis to strike the tool bit, and an intermediate shaft supported for rotation in the tool housing and geared to the motor output so that the intermediate shaft is driveable by the motor, and a slip clutch assembly between the intermediate shaft and the spindle for transmitting torque from the intermediate shaft to the spindle and including an annular clutch member geared to the intermediate shaft, and means for transmitting torque from the clutch member to the spindle, being operably engaged to transmit torque from the clutch member to the spindle when torque is below a predetermined value, being disengaged to interrupt torque transmission between the clutch member and the spindle when torque is above the predetermined value, and including a plurality of circumferentially spaced apart detent depressions in the outer surface of the spindle and respectively including a like plurality of circumferentially spaced apart pockets in the clutch member, each pocket including a ramped surface, a like plurality of ball members each positioned in one of the pockets in the clutch member and being movable between seated positions in the detent depressions to engage torque transmission between the clutch member and the spindle, and unseated positions with respect to the detent depressions to disengage torque transmission between the clutch member and the spindle, each of the ball members engaging the ramped surface of one of the pockets, and means for biasing the ball members toward seated positions including the ramped surfaces of the pockets and a spring member operatively engaging the ball members.

13. A power tool as set forth in claim 10 wherein the detent depressions are conical depressions each having a vertex oriented perpendicularly to the tool axis.

14. A rotary hammer as set forth in claim 8 wherein the clutch member is axially stationary relative to the spindle.

15. A rotary hammer as set forth in claim 8 wherein the motor output includes an armature pinion, wherein the intermediate shaft meshes with the armature pinion, and wherein the clutch member includes gear teeth meshing with the intermediate shaft.

16. A spindle assembly for use in a power tool and comprising a tool spindle including an axis of rotation, an outer surface having a plurality of circumferentially spaced apart detent depressions, and a front end portion adapted to receive a tool bit, an annular clutch member supported on the tool spindle and including a like plurality of circumferentially spaced pockets respectively opposing the detent depressions and including respective ramp surfaces, a like plurality of ball members respectively retained in the pockets against circumferential movement relative to the clutch member and being movable between seated positions in the detent depressions to engage torque transmission between the clutch member and the tool spindle, and unseated positions with respect to the detent depressions to disengage torque transmission between the clutch member and the tool spindle, and a spring member in operative engagement with the ball members for biasing the ball members toward the ramp surfaces so as to locate the ball members in the seated positions in the detent depressions.

17. A spindle assembly as set forth in claim 16 wherein the clutch member is axially stationary relative to the tool spindle.

18. A spindle assembly as set forth in claim 16 wherein the clutch member includes gear teeth adapted to mesh with a drive train in the power tool to drive the tool spindle.

19. A spindle assembly as set forth in claim 16 wherein the detent depressions are conical depressions each having a vertex oriented transversely to the axis of rotation of the tool spindle.

20. A spindle assembly for use in a power tool and comprising a tool spindle including an axis of rotation, an outer surface having a plurality of circumferentially spaced apart conical depressions each having a vertex oriented transversely to the axis of rotation of the tool spindle, and a front end portion adapted to receive a tool bit, an annular clutch member supported on the tool spindle and including a like plurality of circumferentially spaced pockets opposing the conical depressions and respectively including a ramped surface, and a like plurality of ball members respectively retained in the pockets against circumferential movement relative to the clutch member and being movable between seated positions in the conical depressions to engage torque transmission between the clutch member and the tool spindle, and unseated positions with respect to the conical depressions to disengage torque transmission between the clutch member and the tool spindle, and a spring member in operative engagement with one of the ball members and the clutch member for biasing the ball members toward the seated positions in the conical depressions, the spring member biasing the ball members into engagement with the ramped surfaces to redirect the ball members radially inwardly relative to the spindle, and wherein the spring member extends toward the front end of the tool spindle from the clutch member.

21. A power tool comprising a tool housing, a shaft rotatably mounted in said tool housing and including an outer surface including a plurality of circumferentially spaced detent depressions, a driving member rotatably mounted in said tool housing, an annular clutch member located in encircling relation to said shaft, rotatively driven by said driving member, and including a like plurality of circumferentially spaced pockets respectively corresponding to said shaft detent depressions and respectively including ramp surfaces, a like plurality of torque transmitting elements respectively located in said pockets and being movable between seated positions in said detent depressions to effect torque transmission from said drive member through said clutch member to said shaft, and unseated positions with respect to said detent depressions to effect discontinuance of torque transmission from said drive member to said shaft, and a biasing member operatively engaging said torque transmitting elements to bias said torque transmitting elements toward said ramp surfaces so as to locate said torque transmitting elements in said seated positions in said detent depressions.

\* \* \* \* \*